(12) United States Patent
Alvarez

(10) Patent No.: US 9,398,353 B2
(45) Date of Patent: Jul. 19, 2016

(54) METHOD AND SYSTEM FOR PRE-RESERVATION TIMER ADAPTATION IN PCE BASED NETWORKS

(71) Applicant: Telefonica, S.A., Madrid (ES)

(72) Inventor: Victor Lopez Alvarez, Madrid (ES)

(73) Assignee: Telefonica, S.A., Madrid (ES)

( * ) Notice: Subject to any disclaimer, the term of this patent is extended or adjusted under 35 U.S.C. 154(b) by 219 days.

(21) Appl. No.: 14/157,665

(22) Filed: Jan. 17, 2014

(65) Prior Publication Data

US 2014/0205288 A1    Jul. 24, 2014

(30) Foreign Application Priority Data

Jan. 18, 2013   (EP) .................................... 13382018

(51) Int. Cl.
*H04L 12/28*   (2006.01)
*H04Q 11/00*   (2006.01)
*H04L 12/717*  (2013.01)

(52) U.S. Cl.
CPC ............ *H04Q 11/0003* (2013.01); *H04L 45/42* (2013.01)

(58) Field of Classification Search
USPC .................................................. 709/242, 238
See application file for complete search history.

(56) References Cited

U.S. PATENT DOCUMENTS

| | | | | |
|---|---|---|---|---|
| 8,238,334 B2 * | 8/2012 | Dunbar | ............. | H04L 29/12113 370/389 |
| 8,442,030 B2 * | 5/2013 | Dennison | ............. | H04L 12/4625 370/217 |
| 8,824,274 B1 * | 9/2014 | Medved | .................. | H04L 41/12 370/217 |

* cited by examiner

*Primary Examiner* — Duc C Ho
(74) *Attorney, Agent, or Firm* — Sughrue Mion, PLLC

(57) ABSTRACT

The method updating the status of a network by means of a protocol of the control plane of said network and in response to a path request from at least a path computation client (PCC) pre-reserving during a reserved period of time ($T_{res}$), by at least one path computation element (PCE), a plurality of network resources in at least one traffic engineering database (TED) of the at least one PCE. The method dynamically modifying by a timer policy said reserved period of time ($T_{res}$) by at least using information data regarding the delay of said control plane.
The system of the invention is adapted to implement the method of the invention.

18 Claims, 6 Drawing Sheets

METHOD AND SYSTEM FOR PRE-RESERVATION TIMER ADAPTATION IN PCE BASED NETWORKS

FIELD OF THE ART

The present invention relates generally to telecommunications, and more particularly, to a method and a system for Pre-Reservation timer adaptation in PCE based networks.

PRIOR STATE OF THE ART

The present invention tries to solve the current problems in Path Computation Element (PCE) architecture. The PCE requires update network state information, which is updated via OSPF Link-State Advertisement (LSA) messages [6] and is stored in the Traffic Engineering Database (TED). As the PCE computes the route based on TED information, PCE can reply with resources that are already reserved when the TED information is different from the real network state. When the Label Switch Router (LSR) requests the path, the control plane denies the request since these resources are already occupied. This type of block is called "stolen-lambda" block. This problem is especially important in Wavelength Switch Optical Networks (WSON), where each try may take minutes due to equalization of the optical elements.

Current solution proposed in [2] and evaluated in [3] is based on a fixed timer to pre-reserve the resources. However, when network conditions change, this timer must be updated to dynamically to avoid the "stolen-lambda" block.

The research community and the industry have done a great effort in the last years to provide a common control plane by standardizing Generalized Multi-Protocol Label Switching (GMPLS). GMPLS allows a dynamic and distributed configuration of the optical layer. However, the computation of optical paths becomes complex in terms of computation when the impairments induced by optical technologies are taken into account. If such computation is done into the GMPLS controller, the hardware requirements increase and, consequently, the node cost. On the other hand, PCE solutions for multi-domain scenarios improve the path computation process and facilitate the multi-vendor interoperability.

PCE architecture has been standardized [1] to reduce such computation and interoperability problems. In PCE architecture, there is a PCE in each domain, which receives the request from the Path Computation Clients (PCC). Once the PCC receives the information about the route for the path, RSVP messages are exchange normally. Traffic Engineering Database (TED) of the PCE is updated using OSPF. Therefore, when there are two requests in a short time period, it may happen that PCE assigns the route with a shared network segment. When the network elements try to reserve the resources, they are already reserved by other network element. This situation is shown in FIG. 1. Node 1 requests a path to the PCE, which responses with a path between Node 1, 2 and 3 using lambda 1. In a short period of time, Node 2 requests a path to Node 3, receiving a path Node 2 and 3 and lambda 1. Node 1 starts the reservation process using standard RSVP PATH messages, but Node 2 receives a RSVP Error message as Node 2 and Node 3 using Lambda 1 is already reserved. This effect will be called "stolen-lambda" block.

Authors in [2] propose a pre-reservation (PR) mechanism to avoid the "stolen-lambda" block. This mechanism pre-reserves the resources in the PCE TED when there is a path request for a given time ($T_{res}$). Once the $T_{res}$ timer expires, the PCE removes the reservation state of such resources. If the path was established, the OSPF LSA messages update the PCE TED properly. FIG. 2 shows how PCE replies with a different lambda to the Node 2, because the path 1, 2, 3 with lambda 1 is pre-reserved for the previous request from Node 1.

According to the results in [3], when using PR mechanism, the "stolen-lambda" block is eliminated if $T_{res}$ is long enough and control plane delay does not change. Work in [3] is focus on WSON networks, but this effect may be eliminated in other scenarios where PCE have to compute routes over discrete elements (TDM slots, flexgrid scenarios, etc.). In the case of MPLS networks, PR mechanism does not solve this "stolen-lambda" effect, because PCE has the information of the remaining bandwidth, not about the circuit's provision in each link. This invention allows the elimination of "stolen-lambda" effect even when control plane delay is varying, but as it is based on PR mechanism it does not eliminate the "stolen-lambda" effect in MPLS networks.

$T_{res}$ value may increase the blocking probability in the network if it is not defined properly. If $T_{res}$ parameter is very small, the pre-reservation is so short that the pre-reservation is not enough to avoid the repetition in the responses. On the other hand, if $T_{res}$ is highly increased the pre-reservation may remain in the PCE TED even when the resources are released in the control plane. $T_{res}$ parameter must be greater than the control plane delay, but smaller than the connection holding time. Existing solution [2] do not propose any mechanism to adjust the $T_{res}$ timer based on the control plane delay. This delay may be different depending on the network situation and on the requests demands.

The definition of the value of $T_{res}$ dynamically is necessary to prevent all the blockages in the network. Pre-Reservation mechanism allows eliminating "stolen-lambda" effect in WSON networks [3] in case the control plane delay does not change. However, if control plane delay changes this parameter must be modified accordingly. The object of the present invention is to provide a mechanism to dynamically modify this pre-reservation timer.

REFERENCES

[1] A. Farrel, J. P. Vasseur, and J. Ash, "A path computation element (PCE)-based architecture," *IETF RFC* 4655, pp. 1-40, August 2006. Online (November 2009): http://tools.ietf.org/html/rfc4655.

[2] O. Gonzalez de Dios, et. al. "PCEP Extensions for Temporary Reservation of Computed Path Resources and Support for Limited Context State in PCE," *IETF RFC* draft, pp. 1-19, April 2012. Work in progress (September 2012): http://tools.ietf.org/html/draft-gonzalezdedios-pce-reservation-state-01.

[3] D. Álvarez, V. López, J. L. Añamuro, J. E. López de Vergara, O. González de Dios and J. Aracil: "Utilization of Temporary Reservation of Path Computed Resources for Multi-Domain PCE Protocols in WDM Networks", in the proceedings of Network of the Future conference, November 2011.

[4] J L. Le Roux and J P. Vasseur, "Path Computation Element (PCE) Communication Protocol (PCEP)", IETF RFC 5440, pp. 1-87, March, 2009. Available online: http://tools.ietf.org/html/rfc5440

[5] ITU-T, "Architecture for the Automatically Switched Optical Network (ASON)—Rec. 8080/Y.1304," 2001.

[6] K. Kompella, Y. Rekhter, "OSPF Extensions in Support of Generalized Multi-Protocol Label Switching (GMPLS)", October 2005. Online: http://tools.ietf.org/html/rfc4203

[7] D. Awduche, L. Berger, D. Gan, T. Li, V. Srinivasan, G. Swallow, "RSVP-TE: Extensions to RSVP for LSP Tunnels", December 2001. Online: http://tools.ietf.org/html/rfc3209

SUMMARY OF THE INVENTION

This invention allows a dynamic adaptation of the $T_{res}$ parameter based on network status information. Such adaptation can be done using control plane information or using monitoring modules to get information about network delay. Thanks to this adaptation, using this invention the "stolen-lambda" effect can be eliminated from the network even when control plane delay may change.

In accordance with this invention, the previous objective is obtained, in a first aspect, by providing a method for Pre-Reservation timer adaptation in PCE based networks, comprising updating the status of a network by means of a protocol of the control plane of said network and in response to a path request from at least a path computation client (PCC) pre-reserving during a reserved period of time ($T_{res}$), by at least one path computation element (PCE), a plurality of network resources in at least one traffic engineering database (TED) of the at least one PCE.

On contrary to the known proposals, the method of the first aspect comprises dynamically modifying by a timer policy said reserved period of time ($T_{res}$) by at least using information data regarding the delay of said control plane.

The timer policy can also dynamically modify said reserved period of time ($T_{res}$) by using information data regarding said updated network status.

In an embodiment, the timer policy module can be located as a module in at least one network element (NE) of the network. Thanks to this timer policy module the at least one network element (NE) can receive information about the success or failure of said path request and can send measurements to other network elements (NEs) of said network in order to measure the delay of said control plane.

In another embodiment, the timer policy can be included directly in said at least one PCE as an algorithm. In this situation, the timer policy receives information from a PCEP controller of said at least one network element (NE) to correlate the information provided by said at least one PCE with the information data regarding said updated network status.

Preferably in order to increase the blocking probability in the network the reserved period of time ($T_{res}$) is greater than the control plane delay and smaller than a connection holding time of said network.

A second aspect of the present invention relates to a system for Pre-Reservation timer adaptation in PCE based networks, comprising:
  means for updating the status of a network;
  at least one path computation element (PCE) adapted to pre-reserve during a reserved period of time ($T_{res}$), in response to a path request from at least a path computation client (PCC), a plurality of network resources in at least one traffic engineering database (TED) of the at least one PCE; and
  a module including a PCEP decoder, a delay monitor and an I-NNI decoder.
On contrary to the known proposals, in the system of the second aspect said module further comprises:
  a stolen lambda correlator module adapted for detecting if there are stolen lambda blocks; and
  a reserved period decisor module adapted for measuring said reserved period of time, wherein it provides a timer policy adapted to dynamically modify said reserved period of time ($T_{res}$) by at least using information data regarding the delay of said control plane.

In an embodiment, said timer policy can be located in at least one network element (NE) of said network or can be directly included in said at least one PCE.

The reserved period decisor module is further adapted for sending said measured reserved period of time to a PCEP controller of said at least one network element (NE) or to a TEDB module of said at least one PCE.

The timer policy further comprises a plurality of external and internal interfaces.

Preferably, the means for updating the network status are provided by an Open Shortest Path First (OSPF) protocol and said network is a Wavelength Switch Optical Network (WSON) or any other network having similar characteristics.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
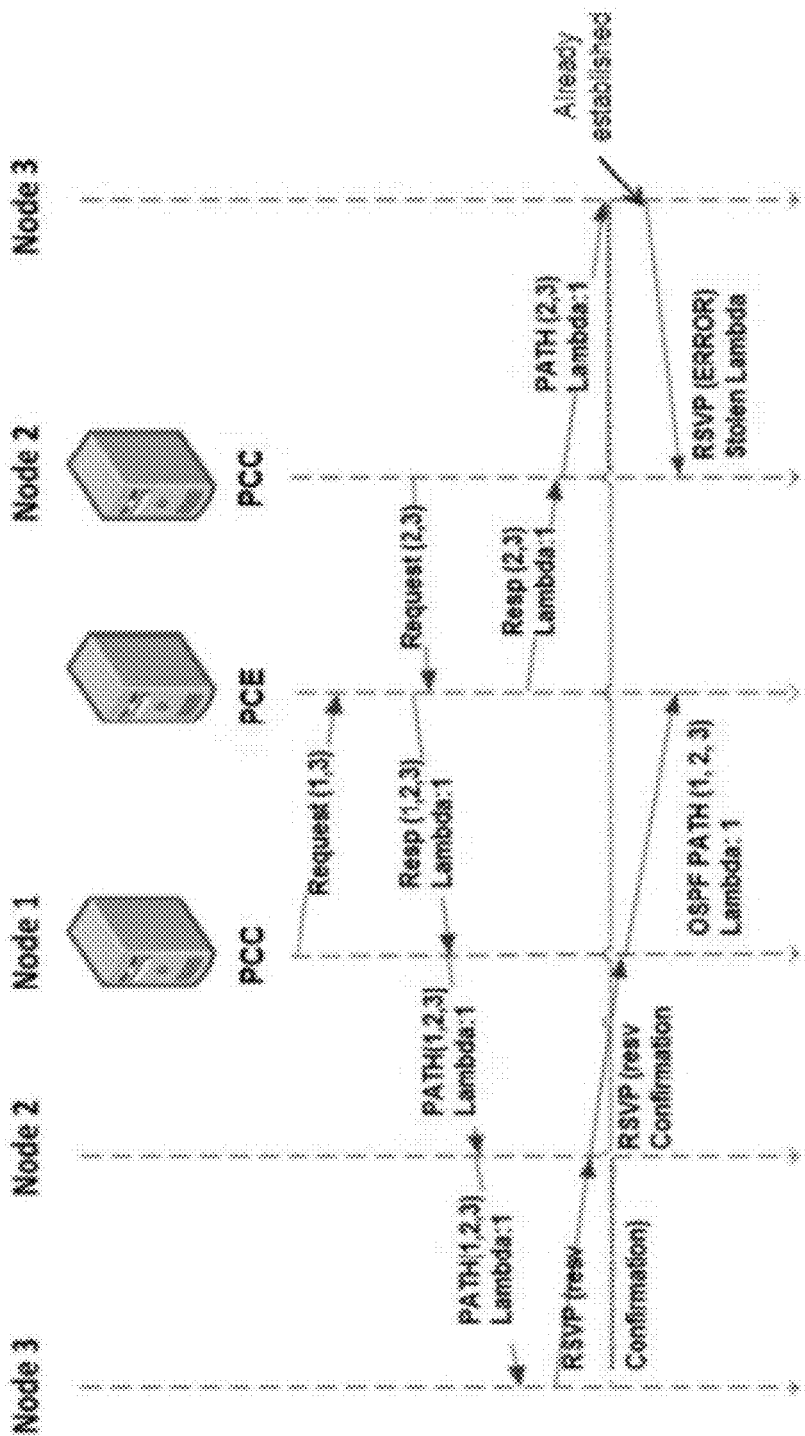
FIG. 1 is an illustration of the "Stolen lambda" process.
Figure 2:
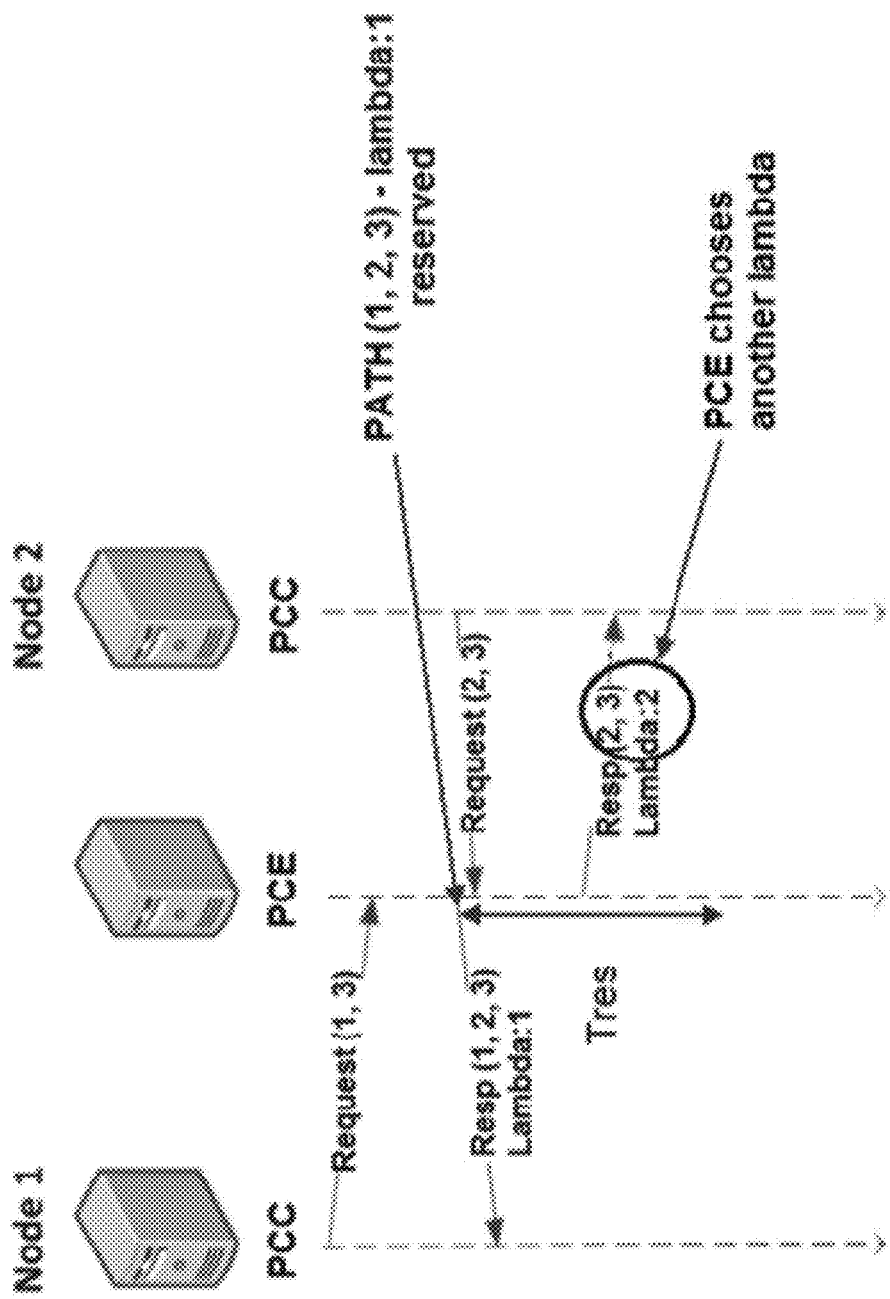
FIG. 2 shows an example of the Pre-Reservation mechanism which the present invention is based.
Figure 3:
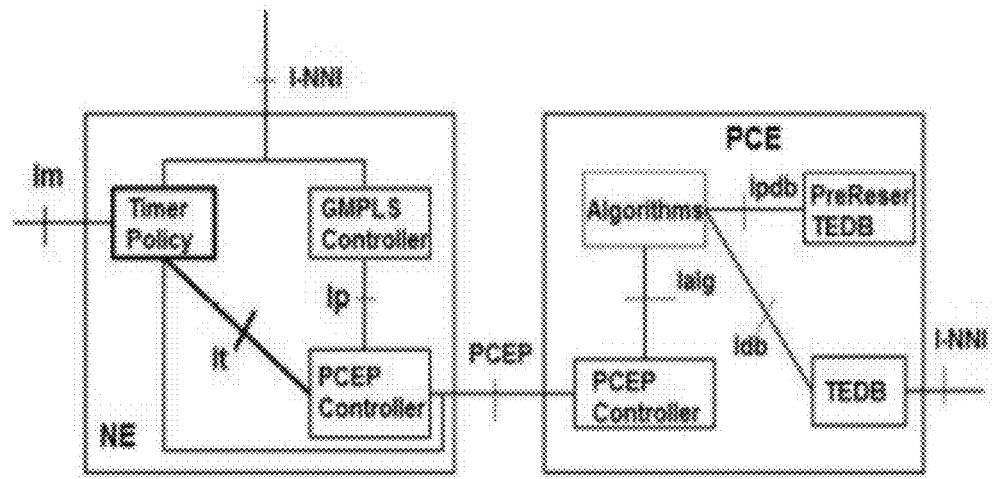
FIG. 3 is an embodiment of the proposed solution based on a NE implementation; in this case, the timer policy module is added to the NE.

FIG. 3 shows in an embodiment the case in which a module called "Timer Policy" is added to a network element (NE). Currently, a NE is composed by GMPLS and PCEP controllers, which are in charge on carrying out the functionalities of GMPLS and PCE protocols. Thanks to this module; each NE in the network can obtain statistics about the success or failure in their control plane requests and can send active measurements to other NEs to measure the delay of the control plane. A NE can modify the pre-reservation timer for the requests sent to the PCE as shown in FIG. 3.

Figure 4:
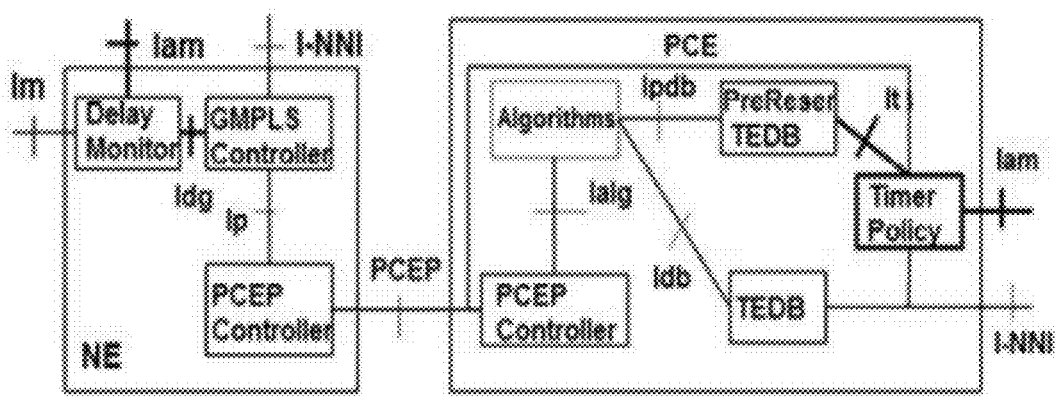
FIG. 4 is an embodiment of the proposed solution based on PCE implementation; the timer policy module in this case is directly included in the PCE.

FIG. 4 shows in an embodiment the case in which the pre-reservation policy is included directly in the PCE as an algorithm, the module can be included in the PCE so based on the OSPF updates the timer policy module can obtain the statistic like if it was in the NE and it can send active measurements to the network. In this situation, Timer policy module requires PCEP information to correlate the information provided by PCE and the real network information provided by OSPF updates.

Figure 5:
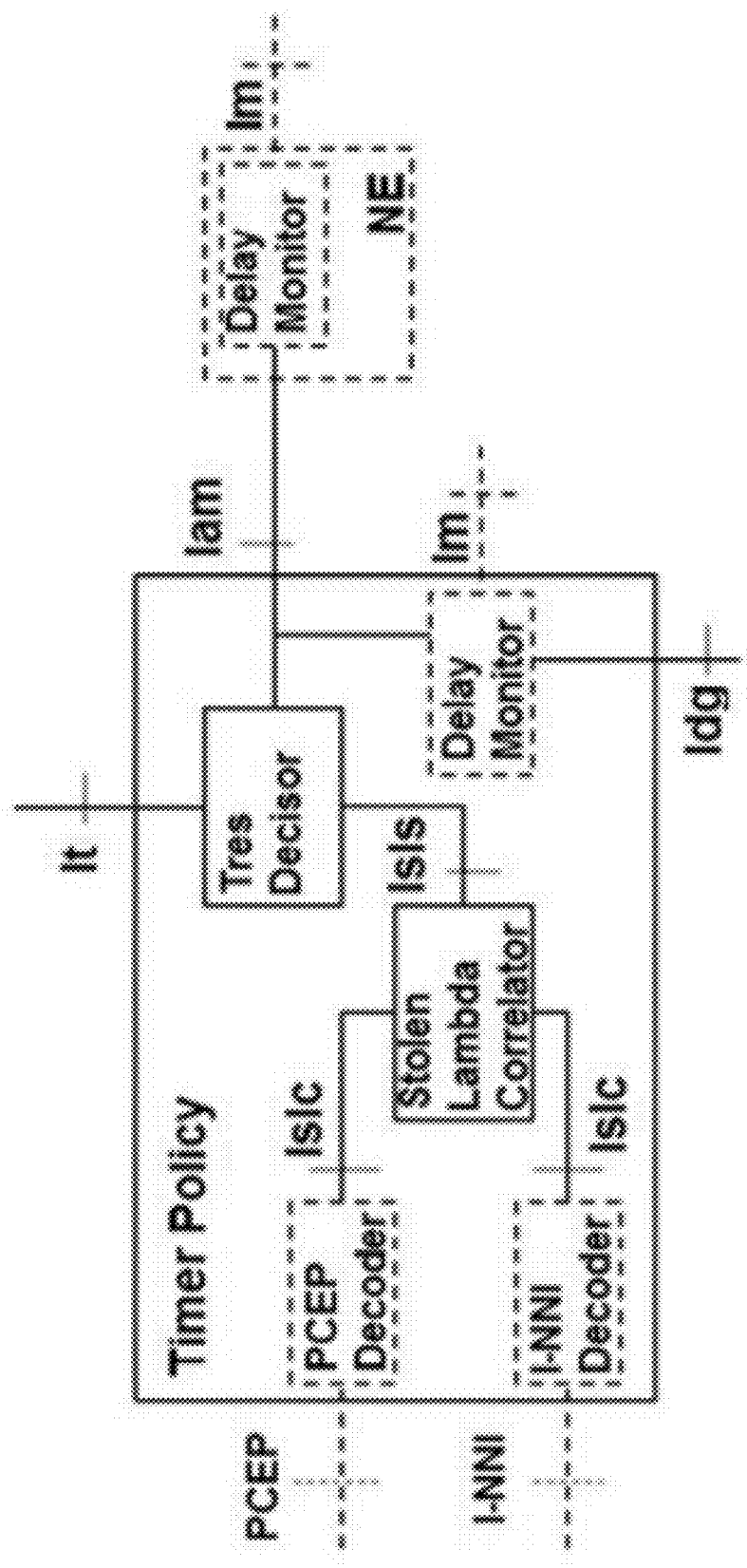
FIG. 5 is a detailed architecture description of the timer policy module.

FIG. 5 shows a detailed description of the Timer Policy module. There are some state of the art components which are out of the scope of the patent (dashed-line in the figure), but which are related to the architecture:

Network Element (NE): is an entity, which enables the data transmission and uses control plane. The NE can be (but not limited to) routers, switches, OXCs, ROADMs, etc.

I-NNI Decoder. This module decodes OSPF LSA messages to track the establishment and deletion of new paths. When the Timer Policy module is in the NE, this module also decodes RSVP messages to detect the success or failure in the path establishment.

PCEP Decoder. This module listen PCEP interface and monitor request and reply messages to monitor the information provided by the PCE. This module is not required when the Timer Policy module is embedded in the NE, as the NE can know the information about the responses from the PCE decoding PCEP messages.

Stolen Lambda Correlator. This module is in charge of detecting when there are "stolen lambda" blocks. This module receives the path set-up information (provided by the PCE) as well as the OSPF LSAs or RSVP Error messages, so the module can know if there were failures in the control plane establishment because the PCE is replying with common segments. A more detail explanation is given in embodiments section.

Delay monitor. This module is in charge of running active measurements in the network to estimate the delay in the control plane. There are several mechanisms to run active measurements, so this module is out of the scope of the patent. This module must be located in the NE, so each NE can monitor the delay between its neighbours. The measurement process is trigger from the $T_{res}$ Decisor module or it can be run periodically.

$T_{res}$ Decisor. This module is in charge of deciding the value for the $T_{res}$ parameter and sending this information to the PCEP controller or to the pre-reservation TEDB module. The timer value can be updated using any mechanism taking into account the delay or/and the stolen lambda blocking probability information. A more detail explanation is given in embodiments section.

Interfaces

Generic interfaces: There are some interfaces from the state of the art, but are included in the architecture:

PCEP. This interface is the standard Path Computation Element Protocol [4]. This interface allows the calculation of a route between two points.

I-NNI. This interface is defined in ASON architecture (Automatically Switched Optical Network) [5]. This interface typically uses RSVP-TE [7] and OSPF-TE [6] protocols.

Im interface (Delay monitor and network elements). This interface exchanges information to get the delay in certain links. There are several techniques to monitor interfaces and retrieve such information like in OAM systems. This mechanism is out of the scope of this invention.

Ip interface (PCEP and GMPLS controller interface). This interface exchanges the information from the GMPLS controller and the PCEP (FIGS. 3 and 4). Although there are not standards solutions for this interface, there are many vendors implementing this.

External interfaces: The following interfaces are the external interfaces in the client:

It interface ($T_{res}$ Decisor sub-module to PCEP controller or PreReserv TEDB modules interface). This interface exchanges messages from the $T_{res}$ Decisor sub-module with the $T_{res}$ parameter. In the case where the Timer Policy is in the NE, PCEP controller uses this information to fill in the PCEP packets with pre-reservation. In the case where the Timer Policy is in the PCE, PreReserv TED module will use $T_{res}$ value to pre-reserve the resources using this value.

Iam interface (Delay monitor module to $T_{res}$ Decisor sub-module interface). This interface is used to send link delays (<source, destination, delay>) based on the information retrieve from the Delay monitor module.

Idg interface (GMPLS controller and Delay monitor module interface). GMPLS controller can use this interface to request the delay monitor to start measurements in a given set of links.

Internal interfaces: The following interfaces are the internal interfaces in the client:

Islc interface (I-NNI or PCEP decoder and stolen-lambda correlator sub-module interface). I-NNI or PCEP decoder sends ERO messages through this interface so the Stolen Lambda correlator can detect when there was a stolen lambda block. This interface is used by PCEP decoder in the case when the Timer Policy module is in the PCE (FIG. 4) or by the I-NNI decoder when Timer Policy module is in the NE (FIG. 3).

Isis interface (stolen-lambda correlator and $T_{res}$ Decisor sub-module interface). Stolen Lambda correlator sends messages with a NE identifier to notify $T_{res}$ Decisor there is a "stolen-lambda" in a given NE. $T_{res}$ Decisor sends $T_{res}$ value to the stolen-lambda correlator, so stolen lambda correlator is aware of current $T_{res}$ value. Moreover, $T_{res}$ Decisor sends $T_{st}$ timer to the stolen-lambda module, which contains the delay in the control plane.

$T_{res}$ Decisor is the module of the invention which sets $T_{res}$ value. However, it receives the input from two modules "stolen-lambda" correlator and delay monitor. There are several methods to measure and monitor the delay on a network. The delay monitor module may use any method to determine the control plane delay between two NEs in the network through Im interface.

Following, the behavior of "stolen-lambda" correlator module is described and later the procedure of $T_{res}$ Decisor is explained.

Stolen-lambda correlator procedure: Stolen-lambda correlator receives information from PCEP and I-NNI decoders. Depending on where Timer Policy module is located the stolen-lambda correlator can receive RSVP messages or not (FIG. 3 or FIG. 4). Following its behavior is explained in both scenarios:

Timer Policy in the NE (FIG. 3). In this situation stolen-lambda correlator is listening to PCEP interface so it can monitor the responses from the PCE. Moreover, it can listen RSVP messages at the I-NNI interface. Based on RSVP messages, it can detect when there is an error in the control plane in the establishment phase. Once it detects a stolen-lambda block in this node and it notifies $T_{res}$ decisor module.

Timer Policy in the PCE (FIG. 4). In this situation, the module can listen all NEs requests to the PCE. Once there is a request, Stolen-lambda correlator module stores the information of the PCE response as well as the source and destination. If the path is properly updated, Stolen-lambda correlator would receive an OSPF LSA message with these resources occupied. On the other hand, if there were an error in the control plane, this OSPF message would not arrive. After a delay ($T_{st}$), Stolen-lambda correlator notifies $T_{res}$ Decisor. $T_{st}$ timer is setup based on the control plane delay measure by the delay monitor module.

Figure 6:
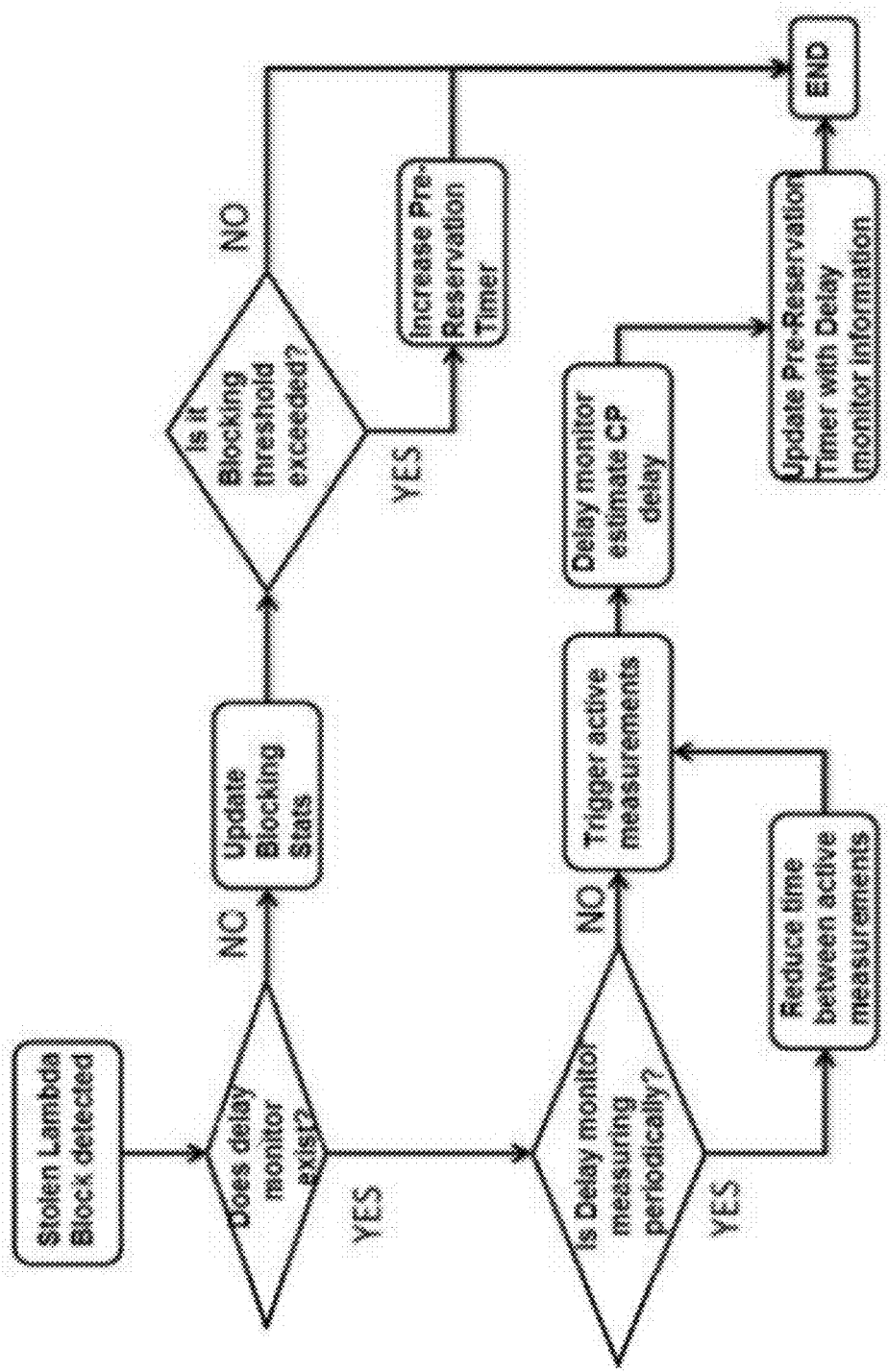
FIG. 6 is a flow diagram showing the steps followed after the detection of a stolen-lambda block.
Figure 7:
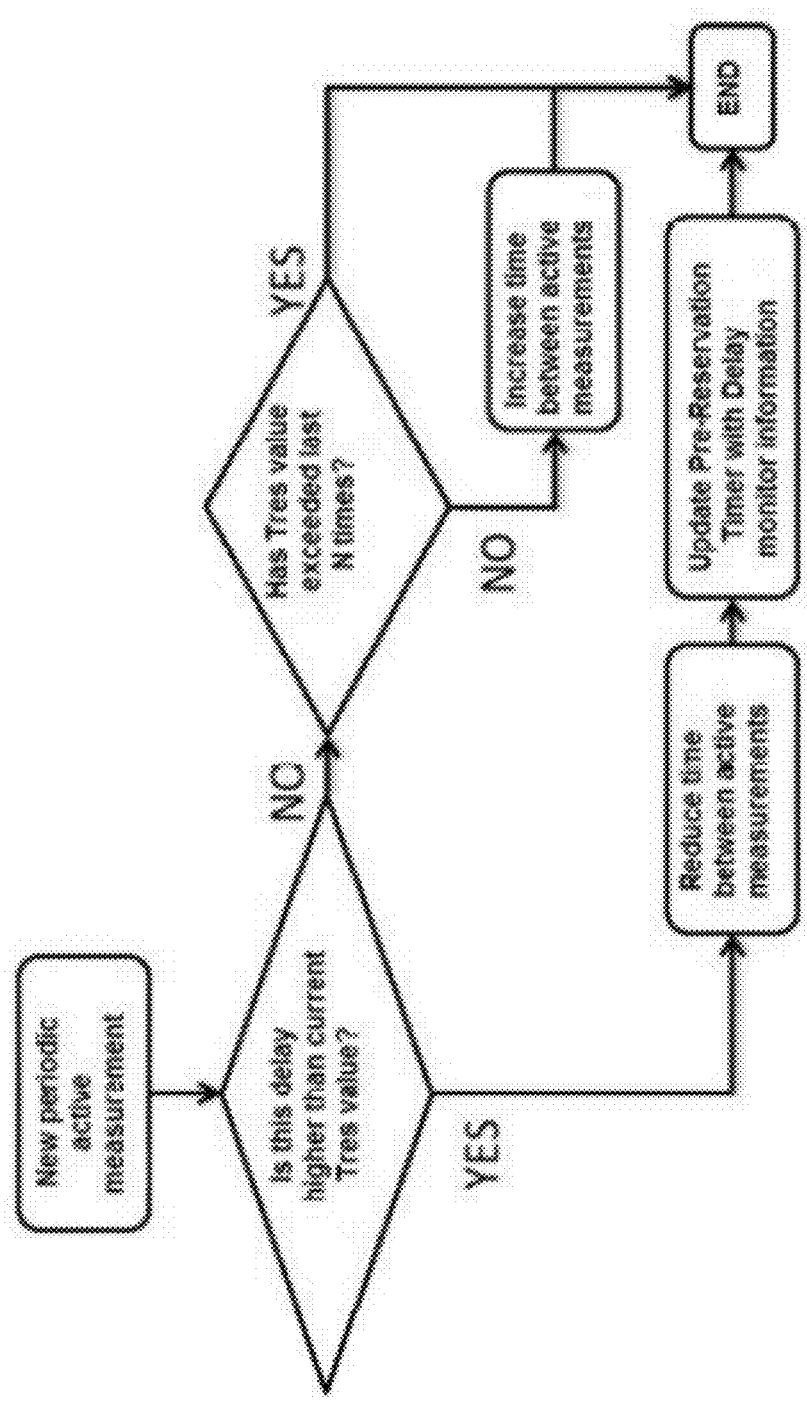
FIG. 7 is a flow diagram showing the steps followed after a periodic active measurement.

The proposed embodiments for the invention used information from the "stolen-lambda" correlator and delay monitor modules. However, Timer policy can update $T_{res}$ value, just with the information of one of them. However, the method is more efficient if both modules are working. Following, two workflows are described the first one trigger by "stolen-lambda" correlator information (FIG. 6) and the second by delay monitor information. Workflow triggered by "stolen-lambda" correlator information:

1. The workflow in FIG. 6 starts when "stolen-lambda" correlator detects a stolen-lambda block.
2. The $T_{res}$ Decisor checks if the delay monitor module exists or not:
    a. NO:
        i. Updates blocking stats.
        ii. As in this case there is no delay information of the control plane, a blocking threshold is defined (for example 0.1%). In this step, $T_{res}$ Decisor checks if this threshold is exceeded:
            1. YES: Increase Pre-Reservation timer a percentage (for example 1%).
            2. NO: END
    b. YES:
        i. $T_{res}$ Decisor, checks if Delay monitor measurement is running in periodic mode.
            1. YES: Reduce the time between active measurements to be more accurate.
        ii. $T_{res}$ Decisor requests Delay monitor to estimate the delay in the control plane.
        iii. Based on the values provided by the Delay monitor module, the $T_{res}$ value is updated.
        iv. END Workflow triggered when there is a periodic active measurement:

1. The workflow in FIG. 7 starts when there is a periodic active measurement of the delay monitor module.
2. The $T_{res}$ Decisor checks if the delay is higher than current $T_{res}$ value:
    a. NO: $T_{res}$ Decisor checks if the $T_{res}$ value has been exceeded in the last N times. This test is done to reduce the active measurements in the network.
        i. NO: Increases time between active measurements and ends.
        ii. YES: END.
    b. YES:
        i. Reduces time between active measurements because network delay is changing.
        ii. Updates $T_{res}$ value with current control plane delay in the network.
        iii. END The foregoing describes embodiments of the present invention and modifications, obvious to those skilled in the art can be made thereto, without departing from the scope of the present invention.

ACRONYMS

ASON Automatically Switched Optical Network
ERO Explicit Route Object
GMPLS Generalized MPLS
I-NNI Internal NNI
LSA Link State Advertisement
LSR Label Switch Router
MPLS Multi-Protocol Label Switching
NE Network Element
NNI Network to Network Interface
OAM Operations Administration and Maintenance
OSPF Open Shortest Path First
PR Pre-Reservation
PCC Path Computation Client
PCE Path Computation Element
PCEP Path Computation Element
PR Pre-Reservation
ROADM Reconfigurable Optical Add-Drop Multiplexer
RSVP Resource Reservation Protocol
TDM Time Division Mutliplexing
TED Traffic Engineering Database
WSON Wavelength Switch Optical Networks

The invention claimed is:

1. A method for Pre-Reservation timer adaptation in Path Computation Element (PCE) based networks, the method comprising:
   updating a status of a network using a protocol of a control plane of the network and in response to a path request from at least a path computation client (PCC) pre-reserving during a reserved period of time ($T_{res}$), by at least one path computation element (PCE), a plurality of network resources in at least one traffic engineering database (TED) of the at least one PCE,
   wherein the method further comprises dynamically modifying by a timer policy the reserved period of time ($T_{res}$) by at least using information data regarding a delay of the control plane.

2. The method according to claim 1, wherein the further modifying by the timer policy the reserved period of time ($T_{res}$) further comprises using information data regarding the updated network status.

3. The method according to claim 2, wherein the timer policy is located as a module in at least one network element (NE) of the network.

4. The method according to claim 2, wherein the timer policy is included in the at least one PCE as an algorithm.

5. The method according to claim 2, wherein the reserved period of time (Tres) is greater than the control plane delay and smaller than a connection holding time.

6. The method according to claim 1, wherein the timer policy is located as a module in at least one network element (NE) of the network.

7. The method according to claim 6, further comprising the at least one network element (NE) receiving information regarding success or failure of the path request and sending measurements to other network elements (NEs) of the network to measure the delay of the control plane.

8. The method according to claim 1, wherein the timer policy is included in the at least one PCE as an algorithm.

9. The method according to claim 8, wherein the timer policy receives information from a PCE Communication Protocol (PCEP) controller of at least one network element (NE).

10. The method according to claim 9, further comprising correlating information provided by the at least one PCE with the information data regarding the updated network status.

11. The method according to claim 1, wherein the reserved period of time ($T_{res}$) is greater than the control plane delay and smaller than a connection holding time.

12. A system for Pre-Reservation timer adaptation in Path Computation Element (PCE) based networks, the system comprising:
   an updater configured to update a status of a network;
   at least one path computation element (PCE) configured to pre-reserve during a reserved period of time ($T_{res}$), in response to a path request from at least a path computation client (PCC), a plurality of network resources in at least one traffic engineering database (TED) of the at least one PCE; and a module including a PCE Communication Protocol (PCEP) decoder, a delay monitor, and an Internal NNI (I-NNI) decoder, wherein the module further comprises:

a stolen lambda correlator module configured to detect if there are stolen lambda blocks; and a reserved period detector module configured to measure the reserved period of time, wherein the module is configured to provide a timer policy configured to dynamically modify the reserved period of time ($T_{res}$) by at least using information data regarding a delay of the control plane.

13. The system according to claim 12, wherein the timer policy is located in at least one network element (NE) of the network.

14. The system according to claim 12, wherein the timer policy is included in the at least one PCE as an algorithm.

15. The system according to claim 12, wherein the reserved period detector module is further configured to send the measured reserved period of time to a PCEP controller of at least one network element (NE) or to a TEDB module of the at least one PCE.

16. The system according to claim 12, wherein the timer policy further comprises a plurality of external and internal interfaces.

17. The system according to claim 12, wherein the updater is configured to use at least an Open Shortest Path First (OSPF) protocol.

18. The system according to claim 12, wherein the network is at least one Wavelength Switch Optical Network (WSON).

* * * * *